United States Patent [19]

Dunn et al.

[11] 4,444,579
[45] Apr. 24, 1984

[54] APPARATUS FOR TEMPERING GLASS SHEETS OF DIFFERENT SIZES AND SHAPES

[75] Inventors: Robert E. Dunn, Pittsburgh; Samuel L. Seymour, Oakmont, both of Pa.

[73] Assignee: PPG Industries, Inc., Pittsburgh, Pa.

[21] Appl. No.: 440,488

[22] Filed: Nov. 10, 1982

[51] Int. Cl.³ .............................................. C03B 27/04
[52] U.S. Cl. ........................................ 65/351; 65/104; 65/114; 65/115; 65/273
[58] Field of Search ................. 65/104, 351, 106, 107, 65/114, 273, 291, 115

[56] References Cited

U.S. PATENT DOCUMENTS

| | | | |
|---|---|---|---|
| 2,677,918 | 5/1954 | Bird et al. | 49/1 |
| 2,790,270 | 4/1957 | Freiberg | 49/45 |
| 2,876,592 | 3/1959 | Black et al. | 49/45 |
| 3,008,272 | 11/1961 | Black et al. | 49/89 |
| 3,024,572 | 3/1962 | Richardson | 49/45 |
| 3,294,518 | 12/1966 | Laseck et al. | 65/348 |
| 3,799,752 | 3/1974 | Cheron | 65/351 |
| 4,071,346 | 1/1978 | Schmidt | 65/351 |
| 4,140,511 | 2/1979 | Imler | 65/114 |
| 4,142,882 | 3/1979 | Imler | 65/114 |
| 4,157,910 | 6/1979 | Imler | 65/351 |
| 4,343,645 | 8/1982 | Abe | 65/348 |

Primary Examiner—Arthur D. Kellogg
Attorney, Agent, or Firm—Edward I. Mates

[57] ABSTRACT

Apparatus capable of tempering bent glass sheets of different sizes and shapes including sharp bends about axes oblique to the length and width of the glass sheets is made possible by supporting end nozzle boxes of tempering apparatus in such a manner that they can be moved relative to center nozzle boxes and also permitting limited pivotal adjustment of the end nozzle boxes about both essentially horizontal and essentially vertical axes to permit the end nozzle boxes to move into positions conforming to the shape of corresponding end portions bent to different orientations relative to the length and/or width of the central portion of the bent glass sheets having different glass sheet patterns, including flat patterns.

15 Claims, 2 Drawing Figures

APPARATUS FOR TEMPERING GLASS SHEETS OF DIFFERENT SIZES AND SHAPES

BACKGROUND OF THE INVENTION

1. Field of the Invention

The present invention relates to the tempering of glass sheets. It has always been a problem in tempering glass sheets to provide apparatus that is readily adjustable for handling glass sheets of different curved configurations. Prior to the present invention, it was very difficult to adjust tempering apparatus to adapt the apparatus for widely different sizes and configurations of different production patterns. Alternatively, different apparatus was required for widely different patterns, particularly those patterns in which the end portions of the glass sheet were bent about axes of bending into planes oblique to both the length and width of the flat development of the bent glass sheet. Also, it has been difficult to adjust prior art tempering apparatus to conform to flat as well as curved shapes.

2. Statement of Technical Problems and Description of Patents of Interest

The process of tempering glass sheets is well known. Conventionally, a glass sheet is tempered by a two step process in which the glass is first heated to an elevated temperature sufficiently high for tempering followed by very rapid cooling to a temperature below the strain point. When glass is tempered, the glass sheets so treated develop a stress pattern in which the tempered glass develops a thin skin of compression stress surrounding an interior stressed in tension. Such a stress distribution through the thickness of the glass makes the glass sheet much stronger then untempered glass so that tempered glass is less likely to fracture than untempered glass when struck by an object. Furthermore, in the less frequent times when an outside force is sufficiently large to cause tempered glass to fracture, tempered glass breaks up into a large number of smoothly surfaced, relatively small particles, which are far less dangerous than the larger pieces with jagged edges that result from the more easily induced fracture of untempered glass.

Typical prior tempering apparatus includes sets of nozzles extending from plenum chambers or nozzle boxes to direct a plurality of cold air blasts against the opposite major surfaces of a glass sheet in directions approximately normal to the opposite localized portions of the major surfaces. Unless there is relative motion between the glass sheet and the nozzles, irisdescent patterns form on the surface of the tempered glass. These patterns of irisdecence develop because fixed air blasts cool fixed locations opposite the blasts rapidly while other locations on the glass sheet intermediate the impingement of air blasts are not cooled as rapidly. When the distance from nozzle to glass differs too greatly between adjacent nozzles, non-uniform cooling of adjacent glass portions may result, also leading to irisdescence.

The glass sheet tempering art has developed many techniques for imparting relative motion between the arrays of nozzles that face the opposite surfaces of a glass sheet to avoid irisdescent patterns. Some of these involve linear reciprocation of the nozzles. Others involve linear movement of glass sheets or linear reciprocation of glass sheets past an array of fixed opposing nozzles. Others involve applying orbital movement (elliptical or circular) of nozzles relative to a glass sheet supported at a fixed position.

The shape of the glass to be tempered and its manner of support between plenum chambers determines the best technique for providing relative movement between the nozzle arrays extending from the plenum chambers and the glass sheet to be tempered. When glass sheets are bent about one sharp axis of curvature, the glass sheet or the nozzle arrays are preferably linearly reciprocated along lines substantially parallel to the sharp axis of curvature. When the glass sheets are shaped and then supported in an essentially horizontal configuration for movement through a cooling station on a ring-like outline supporting member, the glass sheet is supported between upper and lower sets of nozzles whose discharge ends are arranged in surfaces approximately parallel to the curved shape of the glass sheet. Thus, the nozzle to glass distance remains substantially constant during the application of cool tempering medium while providing relative motion. In order to avoid the wear and tear on the flexible air supply elements for tempering apparatus and to avoid the need for large energy consumption in the movement of the tempering apparatus relative to the glass, it has been found preferable to linearly reciprocate the ring-like member which supports the shaped glass sheet between sets of upper and lower nozzles which apply blasts of cold tempering medium, usually air, against the upper and lower major surfaces of the shaped glass sheets supported on the outline ring-like member.

When glass sheets are shaped to complicated shapes having sharp lines of bending that extend oblique to the direction of reciprocation, in order to avoid collision with one or more nozzles, it is necessary that the nozzles be separated by a sufficient vertical distance to permit the shaped glass sheet to move into and out of a position between the nozzles at the shaping station. The nozzle sets need not be so widely separated to allow the glass sheet to be reciprocated a sufficient distance to avoid collisions with nozzles if the nozzle ends are arranged parallel to the glass shape within the area of glass sheet reciprocation. It is also necessary that the nozzle ends be a sufficiently short distance from the opposite major surfaces of the glass sheet during the application of the cold tempering medium so that the blasts of tempering medium applied to the glass be capable of rapidly cooling the glass surfaces. This cooling action is a function of the speed of movement of the blasts against the glass surfaces. However, when the nozzle to glass distance is too short, the hot glass surfaces are likely to distort on initial impingement.

When glass sheets are shaped by the bending method depicted in U.S. Pat. No. 3,846,104 to Samuel L. Seymour, wherein a horizontally oriented glass sheet is heated and lifted by a lower bending mold into contact with an upper bending mold where it is retained by vacuum until the lower bending mold retracts to allow a ring-like member to receive the bent glass sheet and convey it from the bending station into a tempering station, the ring-like member supports the bent glass sheet in a substantially horizontal orientation. The bent glass sheet is reciprocated while mounted between the nozzle arrays on the ring-like member in a direction parallel to the path of movement of the glass from the shaping station to the cooling station. If the axis of the sharp glass sheet bend deviates considerably from an axis parallel to the axis of reciprocation, the tempering nozzles interfere with the glass sheet reciprocation unless the arrays of nozzles are separated from the bent glass sheet by sufficient distance and the reciprocation displacement is sufficiently small to provide clearance for reciprocating the bent glass sheets between the nozzles. If the arrays of nozzles beyond the axes of sharp bending are not capable of adjustment in response to changes in size of the pattern and to changes in the orientation of the lines of sharp curvature, an arrangement of nozzle arrays suitable for cooling sheets of one shape would be totally unsuitable for cooling sheets of a different shape. The same problem exists when a change of size is involved from pattern to pattern. Either certain nozzles would be too far from certain regions of the bent glass or too close or even touching other regions of the bent glass during reciprocation of glass pattern relative to nozzles arranged for a shape or size different from a previous pattern.

Prior to the present invention, the modifications available for rearranging sets of tempering nozzles were limited to conforming to shapes other than those incorporating sharp bends about oblique axes if the nozzle ends were close to the glass. In order to avoid collisions with nozzles during reciprocation, the nozzles had to be arranged at greater distance from the glass. Since the force of nozzle blasts lessens with travel distance to the glass surface, more energy was needed to provide cold air blasts with greater force to assure adequate surface cooling to develop an adequate temper.

U.S. Pat. No. 2,677,918 to Bird et al. discloses apparatus for tempering curved glass sheets having nozzles that are adjustable in length to locate the ends of the nozzles in curved surfaces substantially parallel to the shape of the major surfaces of a bent glass sheet undergoing cooling. Generally, the nozzle arrays are adjustable for bends of non-uniform radii of bending about substantially parallel axes.

U.S. Pat. No. 2,790,270 to Freiberg discloses apparatus for tempering horizontally supported glass sheets that are sharply curved at their longitudinal ends. This patent has a pair of pivoting wing boxes flanking main nozzle boxes and incorporates means for adjusting the manner in which the wing boxes are constrained to pivot about horizontal axes with respect to the main nozzle boxes. The pivoting wing boxes follow different curved shapes about transverse horizontal axes of elongated sharply bent glass sheets. This patent also adjusts the length of the apparatus to receive sheets having different lengths between the axes of sharp bending.

U.S. Pat. Nos. 2,876,592 and 3,008,272 to Black et al. use track sections that are linked together to provide curved paths for engaging the ends of nozzle boxes that move in unison in curved paths parallel to the opposite surfaces of bent glass sheets. This apparatus is limited to treating glass sheets whose curvature is substantially of the same radius from one transverse side edge to the other transverse side edge although the radius may vary along the longitudinal dimension of the glass.

U.S. Pat. No. 3,024,572 to Richardson discloses apparatus for tempering curved glass sheets in which a plurality of rows of nozzles are each individually adjusted toward and away from the position occupied by the major surfaces of the glass sheet so as to have the ends of the nozzle rows lie in curved planes parallel to the curvature of the glass sheet and to one another.

U.S. Pat. No. 3,294,518 to Laseck et al. discloses apparatus for tempering curved glass sheets of different lengths but substantially uniformly curved ends. A plurality of slot nozzles is provided with means for moving the nozzles lengthwise of the slots. Adjacent alternate slots overlap one another at their ends so as to accommodate longer and shorter glass sheets having substantially uniform curved ends in the space between the opposite sets of slotted nozzles.

U.S. Pat. No. 3,799,752 to Cheron discloses tempering nozzles that are articulated so as to assume transverse curvatures that conform generally to the shape of glass sheets being chilled. The cross-sectional shape is uniform along the length of the cooling apparatus.

U.S. Pat. No. 4,071,346 to Schmidt discloses a plurality of axially adjustable nozzles in apparatus for tempering curved glass sheets with inflatable means to lock the nozzles in different positions so as to have the nozzle ends conform to the surfaces of the glass sheets undergoing cooling.

U.S. Pat. Nos. 4,140,511; 4,142,882; and 4,157,910 to Imler disclose nozzles that attach in pivotal relation to nozzle support elements that are movable relative to the glass thickness. When the support elements pivot, blasts from the nozzles sweep across localized sections of a glass sheet of flat or curved configuration undergoing cooling. This apparatus does not need movement either of the glass sheet or the entire tempering apparatus.

U.S. Pat. No. 4,343,645 to Abe discloses apparatus for tempering curved glass sheets. The apparatus includes end nozzle boxes that are adjustable in shape by virtue of adjustable side walls. This apparatus also includes replaceable nozzles to adapt the apparatus for either full temper or partial temper.

None of the patents provides tempering apparatus for horizontally supported bent glass sheets comprising end nozzle boxes capable of pivoting about vertical axes to positions obliquely disposed with respect to centrally disposed nozzle boxes and linearly adjustable relative to the centrally disposed nozzle boxes so as to enable glass sheets bent about axes oblique to their length to reciprocate between upper and lower sets of nozzles having their ends arranged along curved surfaces conforming to the longitudinal curvature of the glass sheets undergoing tempering. None of these patents disclose glass sheet tempering apparatus having end nozzle boxes adjustable in position to have apertured walls extend in planes that are approximately parallel to obliquely extending end portions of the bent glass sheet that are bent about oblique axes relative to the length and width of the flat development of the bent glass sheet.

None of the patents provides tempering apparatus having centrally disposed open-ended nozzle boxes provided with readily removable nozzles to permit end plenums to move slidably relative to the ends of the nozzle boxes to conform to different lengths of the central portion of different glass sheet patterns. None of the patents provides pivotable adjustment of end nozzle boxes to provide a straight as well as a curved space to receive flat glass sheets as well as sharply bent glass sheets for tempering.

SUMMARY OF THE INVENTION

The present invention provides apparatus for tempering glass sheets having different patterns both bent and flat. These include patterns of different lengths and/or patterns having different degrees of curvature. In addition, the present invention provides apparatus for tempering bent glass sheets that have end sections bent about oblique axes to extend in planes that are oblique to either or both the length and width of the glass sheet in a horizontal plane defined by the flat development of the bent glass sheet.

In order to make it possible for the tempering apparatus to provide adequate temper for glass sheets of such different sizes and shapes, it is necessary to provide upper and lower sets of nozzle openings that are arranged along surfaces essentially parallel to the major surfaces of the bent glass sheet so that when the bent glass sheet and its supporting ring-like member are reciprocated between said upper and lower sets of nozzle openings along a horizontal axis that bisects the angle between the oblique axes at which the end portions of the bent glass sheet are bent relative to its relatively flat or gently bent central portion, the displacement of the reciprocating path is limited to avoid collision with a nozzle during reciprocation and the nozzle to glass distance does not vary unduly during reciprocation.

Efficient cooling throughout the glass sheet is desired. This efficient cooling is obtained by applying blasts of cold tempering medium from the nozzle openings to the glass surfaces so that the difference in flow of cold tempering medium does not vary greatly from nozzle to nozzle, and the power consumed in forcing cold tempering medium through the nozzles is as little as possible to provide a given force of impingement at the glass surface that is sufficient to cool the glass surface rapidly enough to impart a temper and is not so strong as to cause the heat-softened glass sheet surface to dimple.

Apparatus for performing the present invention comprises an upper set of essentially horizontal, open-ended elongated nozzle boxes having downwardly facing walls provided with apertures; elongated, readily removable nozzles extending downward from said apertures and a lower set of essentially horizontal, elongated open-ended nozzle boxes having upwardly facing walls provided with apertures and elongated, readily removable nozzles extending upward from said latter apertures. The elongated nozzles have predetermined lengths to provide openings that are arranged along upper and lower gently curved or flat surfaces that conform to the shape of the central portion of the bent glass sheet and form the central portion of the upper and lower boundaries of a space that receives the central portion of a glass sheet. An end plenum supported by a carriage adjustably movable relative to the length of the open-ended nozzle boxes is provided in sliding engagement with each end portion of each set of open-ended elongated nozzle boxes in horizontal alignment with the corresponding sets of open-ended nozzle boxes.

A simple or compound end nozzle box is mounted to each end plenum via a pivotable coupling to its associated end plenum to enable the end nozzle box to pivot about an essentially vertical axis of pivoting. Each end nozzle box is located beyond elongated nozzles extending from the open-ended elongated nozzle boxes and has an apertured wall adapted to be positioned to face the obliquely upturned end portion of the bent glass sheet. Means is provided to adjust the angular orientation of the apertured walls that face the obliquely upturned end portions of the bent glass sheet relative to an essentially horizontal axis that extends transverse to the length of the open-ended nozzle boxes.

When the proper elongated nozzles are removed from the apertures in the apertured walls of the open-ended nozzle boxes and the end plenums are moved in sliding relation to the open-ended nozzle boxes and the end nozzle boxes are pivoted about essentially vertical axes and their glass-facing apertured walls pivoted about essentailly horizontal axes to a desired orientation, the space between the upper and lower sets of nozzles and apertured walls conforms to the shape of a bent glass sheet to be tempered.

If the glass sheet to be tempered is bent severely enough to require it, the lower end nozzle boxes flanking the lower set of open-ended nozzle boxes may be pivoted downward and the entire upper set of nozzle boxes lifted, if necessary, to introduce a bent glass sheet into its treatment position prior to cooling. In this case, the lower end nozzle boxes are pivoted upward and the entire upper set of nozzle boxes lowered for application of cold tempering medium toward the reciprocating bent glass sheet and the upper and lower sets of nozzles again separated to remove a bent glass sheet after cooling and to await the introduction of the next bent glass sheet to be tempered. However, usually most patterns merely require a fixed adjustment unique for the pattern to enable the apparatus to cool the bent glass sheet to an adequate temper without requiring movement of nozzle boxes between cooling cycles.

If the glass sheet to be tempered is flat, the end nozzle boxes are pivotally adjusted about horizontal pivot axes to orientations where their glass-facing apertured walls are essentially horizontal.

The benefits of the present invention will be understood better in the light of a description of a preferred embodiment that follows.

BRIEF DESCRIPTION OF THE DRAWINGS

In the drawings that form part of the description of a preferred embodiment, and wherein like reference numbers refer to like structural elements.

DESCRIPTION OF THE PREFERRED EMBODIMENT

Figure 1:
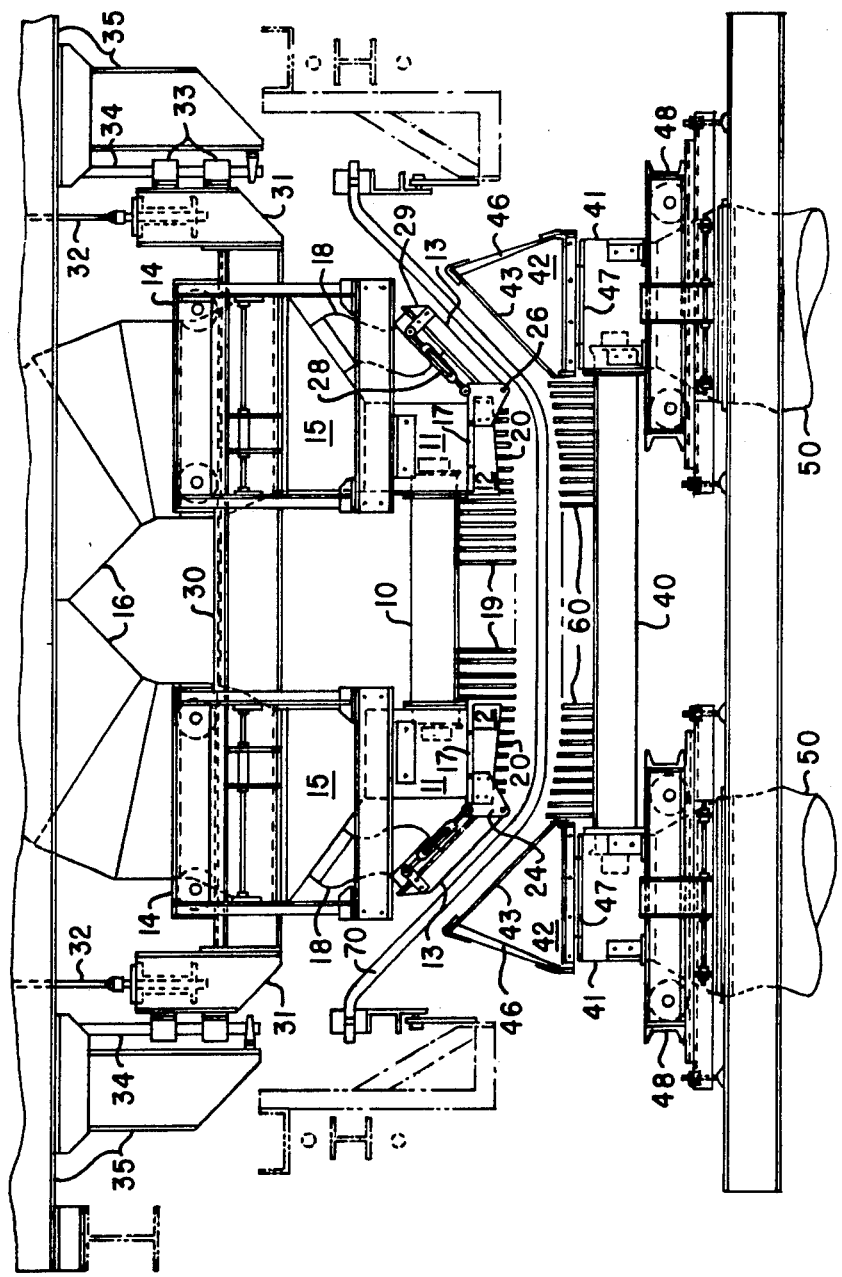
FIG. 1 is a transverse elevational view of apparatus for tempering curved glass sheets according to the present invention.

Referring particularly to FIG. 1, a preferred embodiment comprises an upper set of laterally spaced, open-ended central nozzle boxes 10, each flanked by a pair of upper end plenums 11. Each of the latter pivotally supports a compound end nozzle box comprising an intermediate nozzle box 12 and an upper endmost nozzle box 13. Each upper end plenum 11 is suspended from one or another of a pair of upper carriages 14 mounted for movement along tracks extending transverse of the view seen in FIG. 1. This is in the direction of the longitudinal dimension of the glass sheet undergoing cooling at the tempering apparatus of the present invention.

Tempering medium in the form of air is supplied through upper passages 15 supported by carriages 14 from upper flexible supply conduits 16 which communicate with upper end plenums 11 to intermediate nozzle boxes 12. The end plenums 11 have slotted inner end walls that receive the open ends of the upper central nozzle boxes 10 in sliding relation.

An upper rotatable coupling 17 pivotally secures each intermediate nozzle box 12 to its adjacent upper plenum 11. The couplings 17 permit the upper endmost nozzle boxes 13 to swing with their adjacent intermediate nozzle boxes 12 about essentially vertical axes of pivoting.

Additional flexible feed tubes 18 are provided to communicate between the upper supply conduits and the upper endmost nozzle boxes 13 to supply air under pressure to the upper endmost nozzle boxes 13 for discharge downwardly through apertures in the lower walls of the upper nozzle boxes 13. Elongated, readily removable and replaceable nozzles 19 are provided for upper open-ended nozzle boxes 10 and shorter removable nozzles 20 extend downward from intermediate nozzle boxes 12. Apertures are provided in the lower horizontal walls of open-ended elongated nozzle boxes 10 and intermediate nozzle boxes 12 to receive replaceable nozzles 19 and 20 so that nozzles of proper length are provided with openings within a curved surface conforming to the gently curved or almost flat shape of the central portion of the bent glass sheet. A bracket 24 fixed to each intermediate nozzle box 12 supports a horizontal pivot means 26 for pivoting each of the upper endmost nozzle boxes 13 relative to the intermediate nozzle box 12. An adjustment means 28 interconnects each bracket 24 to a bracket 29 on each upper endmost nozzle box 13 to adjust the angular position of the apertured lower wall of upper endmost nozzle boxes 13 relative to the ends of the intermediate nozzle boxes 12. The angular orientations of the lower walls of the upper endmost nozzle boxes 13 are adjusted to be approximately parallel to the bent end portions of the bent glass sheets.

Horizontal tracks for the upper carriages 14 are mounted on horizontal beams 30 of a vertically movable support structure. The beams 30 of the support structure are fixed at their ends to vertical members 31 which move vertically when actuated by vertical adjustment means (not shown) acting through chain drives 32. Sleeves 33 are fixed to the vertical members 31 for movement along vertical guide rods 34. The latter are fixed to a fixed, rigid support structure 35. Thus, the chain drive 32 is capable of lifting or lowering the vertical movable support structure comprising the upper horizontal beams 30, the upper carriages 14, the upper end plenums 11, the upper open-ended nozzle boxes 10, the intermediate nozzle boxes 12 and the upper endmost nozzle boxes 13 in unison relative to the rigid support structure 35 when desired for maintenance of the tempering apparatus or for providing clearance for handling extremely bent glass sheets, if needed.

The apparatus also comprises a lower set of laterally spaced elongated, open-ended nozzle boxes 40 flanked by lower end plenums 41. The latter have slotted inner end walls constructed in a manner similar to the construction of the upper end plenums 11 to slide relative to the ends of the nozzle boxes 40. The end plenums 11 and 41 are limited in the distance they can be adjusted relative to elongated nozzle boxes 10 and 40 by the width of the end plenums.

A unitary lower end nozzle box 42 is provided for each lower end plenum 41. Each lower end nozzle box 42 is composed of a rubberized fabric and is of essentially triangular configuration in cross-section. An upper apertured inner wall 43 (FIGS. 1 and 2) for each lower end nozzle box 42 comprises an apertured plate that is connected to the corresponding portion of the rubberized fabric (which is provided with apertures corresponding to those in the apertured plate) through a frame reinforcement 44. The apertured plate 43 is angularly adjustable relative to a horizontal folding line 45 that forms an essentially horizontal pivot at the lower inner corner of each lower end nozzle box 42. The latter also has flexible outer wall 46, such as a bellows, to permit the upper inner wall 43 to pivot about horizontal folding line 45 relative to the base of the lower end nozzle box 42. This may be accomplished by mechanical adjustment means or the outer wall 46 may expand when air is applied to box 42 to lift the wall 43 from a normally recessed position. The latter position may be supported in either a horizontal or low angle oblique plane.

A pair of lower rotatable couplings 47 are provided for pivotally connecting the lower end nozzle boxes 42 to the lower end plenums 41 to enable the lower end nozzle boxes to pivot about essentially vertical axes relative to the adjacent lower end plenums 41. These rotatable couplings 47 are similar in construction to the upper rotatable couplings 17 that provide a vertical pivot axis for each upper compound end nozzle box relative to its adjacent upper end plenum 11. Preferably, the lower rotatable couplings 47 are aligned openings in the base of each lower end nozzle box 42 and the roof of each corresponding lower end plenum chamber 41 to enable pressurized air to transfer from the lower end plenum chamber 41 to the adjacent lower end nozzle box 42 for discharge through the upper, apertured inner wall 43.

The apparatus also includes a pair of lower carriages 48. Each carriage 48 supports one or the other lower end plenums 41 for movement in sliding relation to the adjacent end portions of the lower open-ended elongated nozzle boxes 40. The lower end plenums 41 have slotted inner side walls to permit this sliding motion. Flexible lower supply conduits 50 furnish tempering medium (pressurized cold air) to the opposite longitudinal ends of the lower open-ended nozzle boxes 40 via the lower end plenums 41 and also through the rotatable couplings 47 to the corresponding lower end nozzle boxes 42.

A plurality of readily removable lower nozzles 60 extend upward from an apertured upper wall of each lower open-ended nozzle box 40 to discharge cold tempering medium in an upward direction. The lower nozzles terminate in upper openings along a lower surface spaced below the upper surface defined by the openings at the lower ends of the upper elongated nozzles 19 and 20. Thus, a flat or curved space exists to receive the central portion of a bent glass sheet therebetween. The bent glass sheet is supported on a ring-like member (not shown) that is preferably of the type depicted in U.S. Pat. No. 3,973,943 to Seymour, the disclosure of which is incorporated by reference. The ring-like member is preferably a ring conforming to the outline and contour desired for the bent glass sheet. It is light in weight and notched along its upper end to provide minimal interference with the flow of air during tempering.

Each lower end nozzle box 42 is pivoted relative to its adjacent lower end plenum 41 about a vertical axis of pivoting defined by lower rotatable couplings 47 so that the lower end nozzle boxes 42 may have their pivoted inner ends extend along oblique lines or lines normal to the longitudinal dimension of the glass sheet undergoing quenching or cooling. In preparing the apparatus for a particular pattern, the lower end nozzle boxes 42 are pivoted about lower rotatable couplings 47 and upper endmost nozzle boxes 13 are swung about the upper rotatable couplings 17 to have the same orientations in plan and the upper endmost nozzle boxes 13 are pivoted about horizontal pivots 24 to have their lower walls parallel to the end portions of the glass sheets and the apertured upper plates 43 of the lower end nozzle boxes 42 are adjusted in angular position about the horizontal folding line 45 to be approximately parallel to the lower walls of the upper end nozzle boxes 13. These adjustments provide continuations of the space between lower nozzles 60 and upper nozzles 19 and 20 in oblique directions that can be both transversely and longitudinally oblique depending on the glass shape.

Means is provided for reciprocating a carriage support 70 in a longitudinal direction of reciprocation transverse to the length of the glass sheet. This enables the glass sheet to be moved between the upper and lower sets of nozzle boxes to avoid imposing an iridescent pattern during the application of cold tempering medium against the shaped glass sheet. The amplitude of reciprocation is limited to avoid collisions with nozzles 19 and 60 by the obliquely turned end portions of the glass sheet near the oblique lines of sharp bending.

Figure 2:
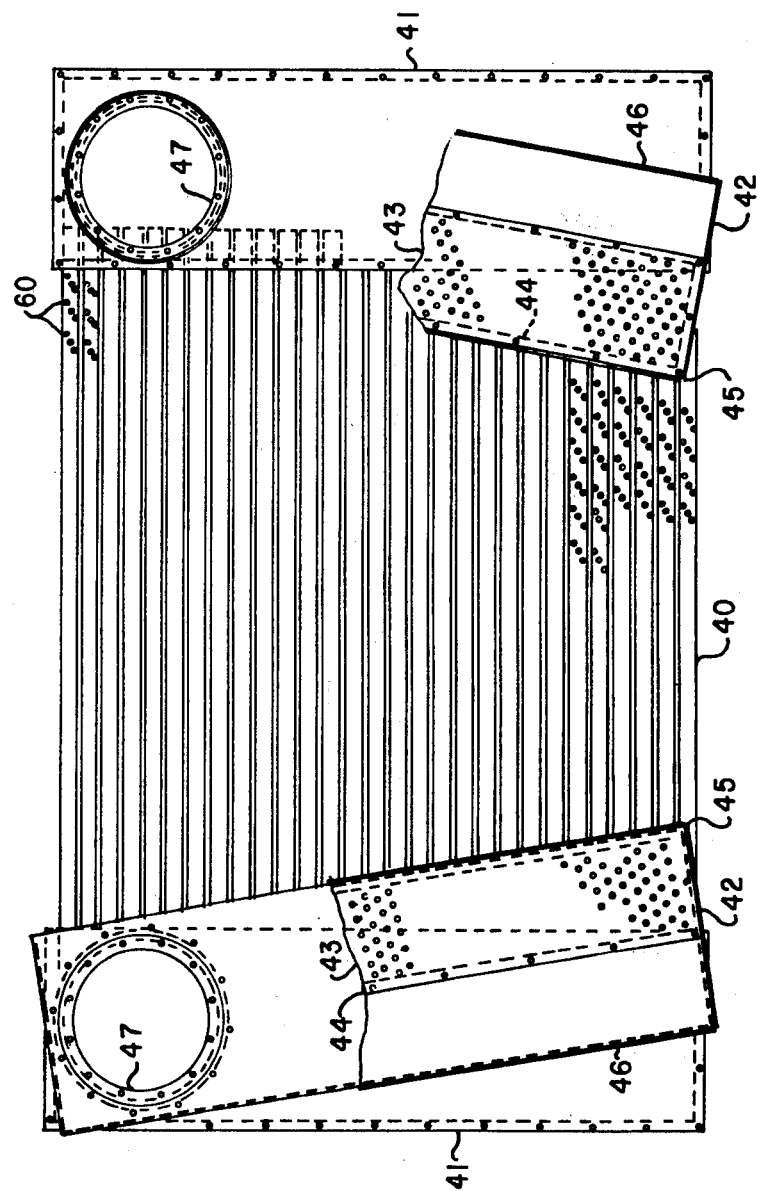
FIG. 2 is a fragmentary plan view of a portion of the apparatus, showing a lower set of elongated, open-ended nozzle boxes and how end nozzle boxes can be pivoted relative to the centrally disposed elongated nozzle boxes of the lower set about a vertical axis according to a preferred embodiment of the present invention.

In case a pattern change involves processing larger glass sheets, the carriages 14 and 48 are separated from one another to separate the end plenums 11 and 41 to limits defined by the ends of the open-ended nozzle boxes, and additional nozzles 19 and 20 inserted in the openings in the apertured central upper and lower nozzle boxes 10 and 40, respectively, which become exposed. For shorter glass sheets, the upper nozzles 19 and lower nozzles 60 extending from the appropriate areas of the nozzle boxes 10 and 40 are removed where needed to permit inward movement of the upper end plenums 11 and the lower end plenums 41 so that the open ended nozzle boxes 10 and 40 form sliding seals with the adjacent end plenums. Also, when the end nozzle boxes 12–13 and 42 are pivoted or swung about upper rotatable couplings 17 and lower rotatable couplings 47, respectively, to extend obliquely as shown in FIG. 2, it will be necessary to remove elongated nozzles from triangular areas to accommodate the intermediate nozzle boxes 12, the upper endmost nozzle boxes 13 and the lower end nozzle boxes 42. Once the tempering apparatus is adjusted for a particular pattern, the positions of the carriages and the orientations of the end nozzle boxes about the respective pivot axes remain fixed until such time as another adjustment is needed.

When glass sheets are brought into the tempering apparatus for quenching, air blasts are applied downwardly through upper nozzle boxes 10, 12 and 13 and applied upwardly through the lower set of nozzle boxes 40 and 42. Vertical spaces are provided between the open-ended nozzle boxes 10 and 40 for escape of spent air blasts in vertical directions from the center of the glass sheets as well as to the opposite lateral sides thereof.

The end nozzle boxes have apertured walls which are pierced in the direction of outward air flow to provide relatively short nozzles facing the end portions of the glass so as to permit air escape toward the opposite ends of the glass sheet. The apertured walls lie in surfaces that are continuations of the surfaces formed by the discharge ends of upper nozzles 19 and 20 and lower nozzles 60.

The present invention may also be performed even if the end lower nozzle boxes are not constructed to have flexible outer sidewalls 46 in the form of bellows as described. Any adjustment means can be provided to adjust the height of the flexible outer sidewalls so as to regulate the orientation of the apertured upper walls 43 so that they provide ready clearance for the entry of the bent glass prior to quenching and move readily into closed position when the glass is in position between the upper and lower sets of nozzles if the glass shape requires such adjustment.

The present invention provides a relatively easily adjustable apparatus for tempering glass sheets of various curvatures and various lengths. The sharply bent end portions of the glass sheet can be chilled uniformly by orienting the upper apertured walls of the lower end nozzle boxes 42 and the lower apertured walls of the upper endmost nozzle boxes 13 to be in positions essentially parallel to the oblique end portions of the bent glass sheets that they face.

Movement of the carriages along the respective track supports in a direction transverse to the view of FIG. 1 adjusts the apparatus to receive longer or shorter glass sheets or sheets having their axis of sharp bending at different distances from one another. The pivoting of the lower end nozzle boxes 42 about the lower rotatable couplings 47 in an essentially vertical axis combined with the pivotal adjustment of the upper apertured walls of lower end nozzle boxes 42 about horizontal fold lines 45 extending widthwise of the treated glass sheet permits the nozzle configurations to conform more readily to the shape of the glass sheet undergoing tempering even though the shapes involve sharply bent end portions that are oblique to the length and width of the glass sheet undergoing tempering. Similar adjustents for the upper set of nozzle boxes including swinging the intermediate nozzle boxes 12 and upper end nozzle boxes about vertical axes of pivoting defined by upper rotatable couplings 17 and the pivotal adjustment of the upper end nozzle boxes 13 about horizontal axes defined by horizontal pivots 26 enable the orientations of the lower walls of the upper end nozzle boxes 13 to be parallel to and spaced from the corresponding end portions of the bent glass sheet.

Apparatus conforming to this invention is readily adjustable to handle flat glass sheets supported on an outline ring-like member having a flat, upper, essentially horizontal glass sheet support surface by pivotally adjusting upper endmost nozzle boxes 13 about horizontal pivots 26 until their glass sheet facing walls are essentially horizontal and pivotally adjusting lower end nozzle boxes 42 about the essentially horizontal pivots formed by folding lines 45 until the apertured upper walls 43 are essentially horizontal. Upper nozzles 19 and 20 and lower nozzles 60 have ends that are aligned with respective glass facing walls of the nozzle boxes 13 and 42.

Glass sheets undergoing tempering in adjustable tempering apparatus just described may vary considerably in size and in pattern of curvature. Nevertheless, when proper adjustments are made to conform to changes in production pattern, bent glass sheets of different sizes and shapes are cooled relatively uniformly by virtue of having the surfaces common to the nozzle openings essentially parallel to the surfaces of the oblique ends of the glass sheet. At the same time, the apparatus of this invention is readily adjustable to have its sets of nozzles conform to different shapes and sizes.

The form of the invention shown and described in this disclosure represents an illustrative preferred embodiment and certain modifications thereof. It is understood that various changes may be made without departing from the gist of the invention as defined in the claimed subject matter which follows.

We claim:

1. Apparatus for tempering glass sheets having different patterns that include flat or bent patterns having different lengths and different curvatures including end portions bent relative to a main portion about axes of bending that extend normal or oblique to the length of the glass sheet and parallel or oblique to the width of the glass sheet, said apparatus comprising an upper set of nozzle boxes and a lower set of nozzle boxes spaced from said upper set, a space between said sets, means for supporting a glass sheet within said space, each set of nozzle boxes comprising open-ended centrally disposed nozzle boxes and end nozzle boxes having apertured walls facing said space, means to impart relative movement between said supported bent glass sheet and said nozzle box sets and means to apply tempering medium to said nozzle boxes for discharge through said apertured walls under pressure, each of said nozzle boxes of each set having an apertured wall facing an apertured wall of a corresponding nozzle box of said other set, elongated nozzles extending from the centrally disposed nozzle boxes of each set of nozzle boxes, at least some of said elongated nozzles being readily removable from said apertured walls of said centrally disposed nozzle boxes and means for moving said end nozzle boxes relative to said centrally disposed nozzle boxes to interpose an inner portion of said end nozzle boxes between selected end portions of said centrally disposed nozzle boxes from which said elongated nozzles are removed and said space to change the length of said space faced by the centrally disposed nozzle boxes.

2. Apparatus as in claim 1, wherein said means for moving said end nozzle boxes comprises an end plenum having an apertured inner end wall enclosing each end of said centrally disposed nozzle boxes for adjusting the positions of said end plenums longitudinally of adjacent ends of said centrally disposed nozzle boxes in an essentially horizontal direction lengthwise of said centrally disposed nozzle boxes and means connecting each said end nozzle box to an associated one or other of said end plenums for movement therewith to adjust the positions of said end nozzle boxes to face the end portions of bent sheets of different length supported in said curved space.

3. Apparatus as in claim 1, wherein each end nozzle box is supported in pivotally adjustable relation to one or the other of said sets of nozzle boxes about an essentially horizontal axis to orient said space facing apertured walls angularly with respect to said centrally disposed nozzle boxes to shape the end portions of said space relative to the central portion of said space.

4. Apparatus as in claim 1, wherein said means for moving said end nozzle boxes comprises a carriage supporting each of said end nozzle boxes through a corresponding end plenum and means for pivotally adjusting the orientation of each said end nozzle box relative to its associated end plenum about an essentially vertical axis.

5. Apparatus as in claim 1, wherein said end plenums are constructed and arranged to have clearance for movement relative to the end portions of said centrally disposed nozzle boxes to permit movement of said end nozzle boxes into positions corresponding to positions occupied by removed elongated nozzles.

6. Apparatus as in claim 4, wherein said end nozzle boxes comprise single chambers.

7. Apparatus as in claim 6, wherein said means for pivotally adjusting said end nozzle box relative to its associated end plenum comprises a rotatable coupling about an essentially vertical axis between said end nozzle box and said associated end plenum.

8. Apparatus as in claim 3, wherein each said lower end nozzle boxes have a bellows type outer wall that is normally relaxed and becomes extended to orient said apertured upper wall about said essentially horizontal axis to an orientation parallel to that of the end portion of the sheet being tempered when tempering medium is applied to said lower end nozzle boxes under pressure.

9. Apparatus as in claim 8, wherein means is provided to support said lower end nozzle boxes with said apertured upper walls oriented essentially horizontally when said bellows are relaxed.

10. Apparatus as in claim 8, wherein means is providad to support said lower end nozzle boxes with said apertured upper walls oriented at a low oblique angle when said bellows are relaxed.

11. Apparatus as in claim 4, wherein at least some of said end nozzle boxes are compound nozzle boxes comprising an intermediate nozzle box and an endmost nozzle box pivotally adjustable to said intermediate nozzle box about an essentially horizontal pivot axis.

12. Apparatus as in claim 11, wherein each said compound nozzle boxes is pivoted to said associated end plenums about an essentially vertical axis of pivoting by a rotatable coupling between said intermediate box and said associated end plenum.

13. Apparatus as in claim 1, wherein said end nozzle boxes have obliquely facing apertured walls facing end portions of said curved space beyond essentially horizontal axes of bending, further including means for pivotally adjusting the angular positions of said end nozzle boxes relative to essentially vertical axes of pivoting.

14. Apparatus as in claim 1, for use in tempering glass sheets having end portions bent obliquely about sharp oblique axes of bending, wherein said means to impart relative motion comprises means to reciprocate said bent glass sheet along a linear axis of reciprocation that bisects an angle between said oblique axes of bending an amplitude sufficiently small to avoid glass to nozzle collision during said reciprocation.

15. Apparatus as in claim 1, wherein said central nozzle boxes are transversely spaced from one another.